US007211237B2

(12) United States Patent
Eberman et al.

(10) Patent No.: US 7,211,237 B2
(45) Date of Patent: May 1, 2007

(54) SOLID STATE SYNTHESIS OF LITHIUM ION BATTERY CATHODE MATERIAL

(75) Inventors: Kevin W. Eberman, St. Paul, MN (US); Jerome E. Scanlan, Cottage Grove, MN (US); Chris J. Goodbrake, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 384 days.

(21) Appl. No.: 10/723,511

(22) Filed: Nov. 26, 2003

(65) Prior Publication Data
US 2005/0112054 A1 May 26, 2005

(51) Int. Cl.
C01D 15/00 (2006.01)
C01D 15/02 (2006.01)
H01M 4/48 (2006.01)
H01M 4/50 (2006.01)
H01M 4/52 (2006.01)

(52) U.S. Cl. .............. 423/594.15; 423/594.4; 423/594.6; 423/599; 423/179.5; 423/138; 423/49; 429/231.3; 429/223; 429/224; 429/231.95

(58) Field of Classification Search ............. 423/594.4, 423/594.6, 599, 179.5, 138, 49, 594.15; 429/231.3, 223, 224, 231.95
See application file for complete search history.

(56) References Cited

U.S. PATENT DOCUMENTS

| 4,567,031 | A | 1/1986 | Riley |
| 4,780,381 | A | 10/1988 | Shacklette et al. |
| 5,264,201 | A | 11/1993 | Dahn et al. |
| 5,292,601 | A | 3/1994 | Sugeno et al. |
| 5,370,948 | A | 12/1994 | Hasegawa et al. |
| 5,393,622 | A | 2/1995 | Nitta et al. |
| 5,474,858 | A | 12/1995 | Merritt |
| 5,478,671 | A | 12/1995 | Idota |
| 5,478,675 | A | 12/1995 | Nagaura |
| 5,521,027 | A | 5/1996 | Okuno et al. |
| 5,525,443 | A | 6/1996 | Okuno et al. |
| 5,531,920 | A | 7/1996 | Mao et al. |
| 5,538,814 | A | 7/1996 | Kamauchi et al. |
| 5,565,688 | A | 10/1996 | Hayashi |
| 5,589,300 | A | 12/1996 | Fauteux et al. |
| 5,609,975 | A | 3/1997 | Hasegawa et al. |
| 5,626,635 | A | 5/1997 | Yamaura et al. |
| 5,718,989 | A | 2/1998 | Aoki et al. |
| 5,742,070 | A | 4/1998 | Hayashi et al. |
| 5,753,202 | A | 5/1998 | Wang et al. |
| 5,770,173 | A | 6/1998 | Nitta et al. |
| 5,783,332 | A | 7/1998 | Amine et al. |
| 5,783,333 | A | 7/1998 | Mayer |
| 5,795,558 | A | 8/1998 | Aoki et al. |
| 5,858,324 | A | 1/1999 | Dahn et al. |
| 5,869,208 | A | 2/1999 | Miyasaka |
| 5,879,654 | A | 3/1999 | Van Ghemen et al. |
| 5,900,385 | A | 5/1999 | Dahn et al. |
| 5,911,920 | A | 6/1999 | Hasezaki et al. |
| 5,948,569 | A | 9/1999 | Moses et al. |
| 5,981,106 | A | 11/1999 | Amine et al. |
| 5,981,445 | A | 11/1999 | Kirchnerova et al. |
| 5,992,773 | A | 11/1999 | Schwechten |
| 5,993,998 | A | 11/1999 | Yasuda |
| 6,007,947 | A | 12/1999 | Mayer |
| 6,017,654 | A | 1/2000 | Kumta et al. |
| 6,030,726 | A | 2/2000 | Takeuchi et al. |
| 6,040,089 | A | 3/2000 | Manev et al. |
| 6,040,090 | A | 3/2000 | Sunagawa et al. |
| 6,045,771 | A | 4/2000 | Matsubara et al. |
| 6,077,496 | A | 6/2000 | Ito et al. |
| 6,103,422 | A | 8/2000 | Kanai |
| 6,168,887 | B1 | 1/2001 | Dahn et al. |
| 6,203,944 | B1 | 3/2001 | Turner et al. |
| 6,203,947 | B1 | 3/2001 | Peled et al. |
| 6,214,493 | B1 | 4/2001 | Bruce et al. |

(Continued)

FOREIGN PATENT DOCUMENTS

EP 0 672 622 9/1995

(Continued)

OTHER PUBLICATIONS

Jiang et al., J. Electrochem. Soc. vol. 152, No. 1, pp. A19-A22, 2005, XP002326063.

(Continued)

*Primary Examiner*—Timothy C. Vanoy
(74) *Attorney, Agent, or Firm*—Lucy C. Weiss; Dean M. Harts

(57) ABSTRACT

Single-phase lithium-transition metal oxide compounds containing cobalt, manganese and nickel can be prepared by wet milling cobalt-, manganese-, nickel- and lithium-containing oxides or oxide precursors to form a finely-divided slurry containing well-distributed cobalt, manganese, nickel and lithium, and heating the slurry to provide a lithium-transition metal oxide compound containing cobalt, manganese and nickel and having a substantially single-phase O3 crystal structure. Wet milling provides significantly shorter milling times than dry milling and appears to promote formation of single-phase lithium-transition metal oxide compounds. The time savings in the wet milling step more than offsets the time that may be required to dry the slurry during the heating step.

18 Claims, 2 Drawing Sheets

U.S. PATENT DOCUMENTS

| | | |
|---|---|---|
| 6,225,017 B1 | 5/2001 | Sato et al. |
| 6,248,477 B1 | 6/2001 | Howard, Jr. et al. |
| 6,255,017 B1 | 7/2001 | Turner |
| 6,270,925 B1 | 8/2001 | Takada et al. |
| 6,274,273 B1 | 8/2001 | Cho et al. |
| 6,277,521 B1 | 8/2001 | Gao et al. |
| 6,284,827 B1 | 9/2001 | Eckhardt et al. |
| 6,291,103 B1 | 9/2001 | Park et al. |
| 6,333,128 B1 | 12/2001 | Sunagawa et al. |
| 6,350,543 B2 | 2/2002 | Yang et al. |
| 6,361,756 B1 | 3/2002 | Gao et al. |
| 6,365,299 B1 | 4/2002 | Miyaki et al. |
| 6,368,749 B1 | 4/2002 | Yanai et al. |
| 6,372,385 B1 | 4/2002 | Kweon et al. |
| 6,395,250 B2 | 5/2002 | Matsubara et al. |
| 6,436,574 B1 | 8/2002 | Numata et al. |
| 6,521,379 B2 | 2/2003 | Nishida et al. |
| 6,551,744 B1 | 4/2003 | Ohzuku et al. |
| 6,579,475 B2 | 6/2003 | Gao et al. |
| 6,582,852 B1 | 6/2003 | Gao et al. |
| 6,589,499 B2 | 7/2003 | Gao et al. |
| 6,589,694 B1 | 7/2003 | Gosho et al. |
| 6,620,400 B2 | 9/2003 | Gao et al. |
| 6,623,886 B2 | 9/2003 | Yang et al. |
| 6,677,082 B2 | 1/2004 | Thackeray et al. |
| 6,680,143 B2 | 1/2004 | Thackeray et al. |
| 6,808,848 B2 | 10/2004 | Nakanishi et al. |
| 6,881,393 B2 * | 4/2005 | Spitler et al. ............... 423/598 |
| 6,884,543 B2 | 4/2005 | Tsujimoto et al. |
| 6,893,776 B2 | 5/2005 | Naruoka et al. |
| 6,964,828 B2 | 11/2005 | Lu et al. |
| 7,078,128 B2 | 7/2006 | Lu et al. |
| 2001/0010807 A1 | 8/2001 | Matsubara |
| 2001/0016285 A1 | 8/2001 | Cho et al. |
| 2001/0031397 A1 | 10/2001 | Kweon et al. |
| 2002/0006550 A1 | 1/2002 | Yang et al. |
| 2002/0012843 A1 | 1/2002 | Munakata et al. |
| 2002/0015887 A1 | 2/2002 | Gao et al. |
| 2002/0018746 A1 | 2/2002 | Gao et al. |
| 2002/0053663 A1 | 5/2002 | Ito et al. |
| 2002/0071990 A1 | 6/2002 | Kweon et al. |
| 2002/0071991 A1 | 6/2002 | Kweon et al. |
| 2002/0086210 A1 | 7/2002 | Naruoka et al. |
| 2002/0119373 A1 | 8/2002 | Gao et al. |
| 2002/0127175 A1 | 9/2002 | Gao et al. |
| 2002/0150530 A1 | 10/2002 | Gao et al. |
| 2003/0022063 A1 | 1/2003 | Paulsen et al. |
| 2003/0027048 A1 | 2/2003 | Lu et al. |
| 2003/0031931 A1 | 2/2003 | Obrovac et al. |
| 2003/0035999 A1 | 2/2003 | Gao et al. |
| 2003/0082452 A1 | 5/2003 | Ueda et al. |
| 2003/0108793 A1 | 6/2003 | Dahn et al. |
| 2004/0197658 A1* | 10/2004 | Kase et al. ............... 429/231.1 |
| 2005/0130042 A1* | 6/2005 | Liu et al. ............... 429/231.3 |
| 2005/0142442 A1* | 6/2005 | Yuasa et al. ............... 429/220 |
| 2005/0260496 A1 | 11/2005 | Ueda et al. |
| 2006/0159994 A1 | 7/2006 | Dahn et al. |

FOREIGN PATENT DOCUMENTS

| | | |
|---|---|---|
| EP | 0 501 187 B1 | 4/1996 |
| EP | 0 468 942 B1 | 1/1997 |
| EP | 0 782 206 A1 | 7/1997 |
| EP | 0 782 206 B1 | 7/1997 |
| EP | 0 813 256 B1 | 12/1997 |
| EP | 0 468 942 B2 | 1/1999 |
| EP | 0 903 796 A1 | 3/1999 |
| EP | 0 918 041 A1 | 5/1999 |
| EP | 0 944 125 A1 | 9/1999 |
| EP | 1 117 145 A1 | 7/2001 |
| EP | 1 189 296 A2 | 3/2002 |
| JP | 55-046288 | 3/1980 |
| JP | 5-67466 | 3/1993 |
| JP | 5-182667 | 7/1993 |
| JP | 5-198301 | 8/1993 |
| JP | 5-283077 | 10/1993 |
| JP | 6-60867 | 3/1994 |
| JP | 6-275264 | 9/1994 |
| JP | 6-275269 | 9/1994 |
| JP | 6-342657 | 12/1994 |
| JP | 7-134985 | 5/1995 |
| JP | 7-235291 | 9/1995 |
| JP | 7-235292 | 9/1995 |
| JP | 8-31408 | 2/1996 |
| JP | 8-37007 | 2/1996 |
| JP | 8-171910 | 7/1996 |
| JP | 8-171935 | 7/1996 |
| JP | 8-213015 | 8/1996 |
| JP | 8-222220 | 8/1996 |
| JP | 2561556 | 9/1996 |
| JP | 08-273665 | 10/1996 |
| JP | 8-315819 | 11/1996 |
| JP | 2668678 | 7/1997 |
| JP | 9-237631 | 9/1997 |
| JP | 2699176 | 9/1997 |
| JP | 10-106562 | 4/1998 |
| JP | 10-106565 | 4/1998 |
| JP | 10-172571 | 6/1998 |
| JP | 10-188982 | 7/1998 |
| JP | 2822659 | 9/1998 |
| JP | 11-25957 | 1/1999 |
| JP | 11-86861 | 3/1999 |
| JP | 1999195416 | 7/1999 |
| JP | 11-213999 | 8/1999 |
| JP | 11-273677 | 10/1999 |
| JP | 11-354156 | 12/1999 |
| JP | 2000-503543 | 3/2000 |
| JP | 3042128 | 3/2000 |
| JP | 2000-173599 | 6/2000 |
| JP | 2000-173667 | 6/2000 |
| JP | 3079382 | 6/2000 |
| JP | 3079613 | 6/2000 |
| JP | 2000-186861 | 7/2000 |
| JP | 2000-195514 | 7/2000 |
| JP | 3089662 | 7/2000 |
| JP | 2000-223122 | 8/2000 |
| JP | 2000-223157 | 8/2000 |
| JP | 2000-231919 | 8/2000 |
| JP | 2000-268821 | 9/2000 |
| JP | 2000-268864 | 9/2000 |
| JP | 3110728 | 9/2000 |
| JP | 2000-277151 | 10/2000 |
| JP | 2000-294240 | 10/2000 |
| JP | 2000-294242 | 10/2000 |
| JP | 2000-323123 | 11/2000 |
| JP | 2000-323142 | 11/2000 |
| JP | 2000-327338 | 11/2000 |
| JP | 2000-327339 | 11/2000 |
| JP | 3130813 | 11/2000 |
| JP | 2000-336109 | 12/2000 |
| JP | 2001-52702 | 2/2001 |
| JP | 3181296 | 4/2001 |
| JP | 3182271 | 4/2001 |
| JP | 2001-143710 | 5/2001 |
| JP | 2001-143760 | 5/2001 |
| JP | 2001-146426 | 5/2001 |
| JP | 3197763 | 6/2001 |
| JP | 2001-185218 | 7/2001 |
| JP | 2001-282767 | 9/2001 |
| JP | 2001-345101 | 12/2001 |
| JP | 3258841 | 12/2001 |
| JP | 2002-42813 | 2/2002 |
| JP | 2002-63900 | 2/2002 |
| JP | 2002-110253 | 4/2002 |

| | | |
|---|---|---|
| JP | 3301931 | 4/2002 |
| JP | 2002-151076 | 5/2002 |
| JP | 3308232 | 5/2002 |
| JP | 3318941 | 6/2002 |
| JP | 2002-260655 | 9/2002 |
| JP | 2002-529361 | 9/2002 |
| JP | 2002-530260 | 9/2002 |
| JP | 3356157 | 10/2002 |
| JP | 2002-338246 | 11/2002 |
| JP | 2002-343356 | 11/2002 |
| JP | 3378222 | 12/2002 |
| JP | 2003-238165 | 8/2003 |
| JP | 3524762 | 2/2004 |
| JP | 3536947 | 3/2004 |
| JP | 3649953 | 2/2005 |
| WO | WO93/04996 | 3/1993 |
| WO | WO 97/26683 | 7/1997 |
| WO | WO 00/03444 | 1/2000 |
| WO | WO 00/23380 | 4/2000 |
| WO | WO 01/15252 A1 | 3/2001 |
| WO | WO 02/40404 A1 | 5/2002 |
| WO | WO 02/089234 | 11/2002 |

OTHER PUBLICATIONS

Jouanneau et al., J. Electrochem. Soc., vol. 150, No. 12, pp. A1637-A1642, 2003, XP002326059.

Macneil et al., J. Electrochem. Soc., vol. 149, No. 10, pp. A1332-A1336, 2002, XP002326060.

Ohzuku et al., Chem. Lett., vol. 30, No. 7, pp. 642-643, 2001, XP002326061.

Venkatraman et al., Electrochem. Com., vol. 6, pp. 832-837, 2004, XP002326062.

Kosova et al., Soft Mechanochemical Synthesis Preparation of Cathode Materials for Rechargeable Lithium Batteries, Elsevier, Paris Mechanochemical Synthesis of Battery Materials, Ann. Chim. Sci. Mat., 27 (6), pp. 77-90 (2002).

Numata et al., "Synethesis and Characterization of layer structured solid solutions in the System Of LiCoO2-Li2MnO3", *Solid State Ionics*, 117, pp. 257-263 (1999).

Numata et al., "Preparation and electrochemical Properties of layered Lithium-Cobalt-Manganese Oxides", *Solid State Ionics*, 118, pp. 117-120 (1999).

"How Jet Mills Operate", The Jet Pulverizer Company, pp. 1-3, dated Oct. 2002, downloaded from the Internet Archive website at http://web.archive.org/web/20021013015854/http:www.jetpul.com/mequip/milloper.htm on Aug. 10, 2006.

Wiles et al., "A new computer program for Rietveld analysis of X-ray powder diffraction patterns", *J. Appl. Cryst.* (1981), 14, pp. 149-151.

Delmas et al., "Soft chemistry in $A_xMO_2$ sheet oxides", *Revue de Chimie minerale*, t. 19, (1982), pp. 343-351.

Hill et al., "Peak Shape Variation in Fixed-Wavelength Neutron Powder Diffraction and its Effect on Structural Parameters Obtained by Rietveld Analysis", *J. Appl. Cryst.* (1985) 18, pp. 173-180.

Delmas et al., "Electrochemical and physical properties of the $Li_xNi_{1-y}Co_yO_2$ phases", *Solid State Ionics* 53-56 (1992), pp. 370-375.

Rossen et al., "Structure and electrochemistry of $Li_xMn_yNi_{1-y}O_2$", *Solid State Ionics* 57 (1992), pp. 311-318.

Jones et al., "Structure and electrochemistry of $Li_xCr_yCo_{1-y}O_2$", *Solid State Ionics* 68 (1994), pp. 65-69.

Richard et al., "The effect of ammonia reduction on the spinel electrode materials, $LiMn_2O_4$ and $Li(Li_{1/3}Mn_{5/3})O_4$", *Solid State Ionics*, 73, (1994), pp. 81-91.

Armstrong et al., "Synthesis of layered $LiMnO_2$ as an electrode for rechargeable lithium batteries", *Letters to Nature*, vol. 381, Jun. 1996, pp. 499-500.

Numata et al., "Synthesis of Solid Solutions in a System of $LiCoO_2$-$Li_2MnO_3$ for Cathode Materials of Secondary Lithium Batteries", *Chemistry Letters* (1997), pp. 725-726.

Richard et al., "A Cell for In Situ X-Ray Diffraction Based on Coin Cell Hardware and Bellcore Plastic Electrode Technology", *J. Electrochem. Soc.*, vol. 144, No. 2, Feb. 1997, pp. 554-557.

Dahn et al., "Structure and Electrochemistry of $Li_2Cr_xMn_{2-x}O_4$ for $1.0 \leq x \leq 1.5$", *J. Electrochem. Soc.*, vol. 145, No. 3 (1998), pp. 851-859.

Spahr et al., "Characterization of Layered Lithium Nickel Manganese Oxides Synthesized by a Novel Oxidative Coprecipitation Method and Their Electrochemical Performance as Lithium Insertion Electrode Materials", *J. Electrochem. Soc.*, vol. 145, No. 4, (1998), pp. 1113-1121.

Neudecker et al., "Lithium Manganese Nickel Oxides $Li_x(Mn_y Ni_{1-y})_{2-x}O_2$", *J. Electrochem. Soc.*, vol. 145, No. 12, (1998), pp. 4160-4168.

Paulsen et al., "Layered Li-Mn-Oxide with the O2 Structure: A Cathode Material for Li-Ion Cells Which Does Not Convert to Spinel", *J. of Electrochem. Soc.*, 146 (10), (1999), pp. 3560-3565.

Cho et al., "Improvement of Structural Stability of $LiCoO_2$ Cathode during Electrochemical Cycling by Sol-Gel Coating of $SnO_2$", *Electrochem. and Solid-State Letters*, 3 (8), (2000), pp. 362-365.

Cho et al., "Novel $LiCoO_2$ Cathode Material with $Al_2O_3$ Coating for a Li Ion Cell", *Chem. Mater.*, 12, (2000), pp. 3788-3791.

Paulsen et al., "O2 Structure $Li_{2/3}[Ni_{1/3}Mn_{2/3}]O_2$: A New Layered Cathode Material for Rechargeable Lithium Batteries", *J. Electrochem. Soc.*, 147 (3) (2000), pp. 861-868.

Desilvestro et al., "Novel layered cathode materials for advanced lithium ion batteries", Pacific Lithium Limited, presented at the International Li Battery Conference in Como, Italy, May 2000.

Naruoka et al., "Development of $LiNi_{1-x-y}Co_xMn_yO_2$ System Positive Active Material for Lithium Ion Cells", *GS News Technical Report*, vol. 59, No. 2, (2000), pp. 13-17.

10th International Meeting on Lithium Batteries, "Lithium 2000", Villa Erba Conference Center, Como, Italy, May 28-Jun. 2, 2000.

Quine et al., "Layered $Li_xMn_{1-y}Ni_yO_2$ intercalation electrodes", *J. Mater. Chem.*, 10, (2000), pp. 2838-2841.

Cho et al., "$LiCoO_2$ Cathode Material That Does Not Show a Phase Transition from Hexagonal to Monoclinic Phase", *J. of Electrochem. Soc.*, 148, (10), (2001), pp. A1110-A1115.

Cho et al., "Zero-Strain Intercalation Cathode for Rechargeable Li-Ion Cell", *Angew. Chem. Int. Ed.*, 40, No. 18, (2001), pp. 3367-3369.

Lu et al., "The Effect of Co Substitution for Ni on the Structure and Electrochemical Behavior of T2 and O2 Structure $Li_{2/3}[Co_xNi_{1/3-x} Mn_{2/3}]O_2$", *J. of Electrochem. Soc.*, 148 (3), (2001), pp. A237-A240.

* cited by examiner

SOLID STATE SYNTHESIS OF LITHIUM ION BATTERY CATHODE MATERIAL

FIELD OF THE INVENTION

This invention relates to the preparation of compounds useful as cathodes for lithium-ion batteries.

BACKGROUND

Lithium-ion batteries typically include an anode, and electrolyte and a cathode that contains lithium in the form of a lithium-transition metal oxide. Transition metal oxides that have been used include cobalt dioxide, nickel dioxide and manganese dioxide.

SUMMARY OF THE INVENTION

Lithium-transition metal oxide compounds in which cobalt, manganese and nickel are each present in the crystal lattice can be referred to as four metal or quaternary cathode compounds. Single-phase lattices containing appropriate amounts of these metals can provide especially desirable lithium-ion battery cathodes. For example, the quaternary compounds:

$$LiNi_{0.1}Mn_{0.1}Co_{0.8}O_2 \quad (I)$$

$$Li(Co_{(1/3)}Mn_{(1/3)}Ni_{(1/3)})O_2 \quad (II) \text{ and}$$

$$Li(Li_{0.08}Co_{0.15}Mn_{0.375}Ni_{0.375})O_2 \quad (III)$$

are of interest if successfully formed as a single-phase (if multiple phases are present, then battery performance suffers). The equimolar manganese and nickel content in these three compounds is especially desirable and is believed to contribute to formation of a more stable crystal lattice.

Unfortunately, it can be difficult to form a single-phase quaternary compound containing the transition metals cobalt, manganese and nickel in a lithium-containing crystal lattice. Attainment of a single-phase can be made easier by excluding one or more of the transition metals manganese or nickel (e.g., to make a three metal or ternary system such as $LiNi_{0.8}Co_{0.2}O_2$ or a two metal or binary system such as $LiCoO_2$), but this may also decrease battery performance or introduce other problems. Attainment of a single-phase quaternary compound may be achieved by coprecipitation of mixed metal hydroxides as recommended and employed in U.S. Patent Application No. 2003/0022063 A1 (Paulsen et al.) entitled "LITHIATED OXIDE MATERIALS AND METHODS OF MANUFACTURE" by coprecipitation of mixed metal nitrates and metal hydroxides as employed in Examples 19 and 20 of U.S. Patent Application No. 2003/0027048 A1 (Lu et al.) entitled "CATHODE COMPOSITIONS FOR LITHIUM-ION BATTERIES". However, coprecipitation requires filtration, repeated washing and drying and thus exhibits relatively limited throughput and high manufacturing costs.

Paulsen et al. also describes and employs in its Example 6 a high-energy ball milling and sintering process to make certain lithium-transition metal oxide compounds having the formula:

$$Li(Li_xCo_y(Mn_zNi_{1-z})_{1-x-y})O_2 \quad (IV)$$

where $0.4 \leq z \leq 0.65$, $0 < x \leq 0.16$ and $0.1 \leq y \leq 0.3$. U.S. Pat. No. 6,333,128 B1 (Sunagawa et al.) entitled "LITHIUM SECONDARY BATTERY" employs in its Examples A1 through A9 a powder mixing, baking and jet milling process to make certain lithium-transition metal oxide compounds having the formula:

$$Li_aCo_bMn_cNi_{1-b-c}O_2 \quad (V)$$

where $0 \leq a \leq 1.2$, $0.01 \leq b \leq 0.4$, $0.01 \leq c \leq 0.4$ and $0.02 \leq b+c \leq 0.5$. These Paulsen et al. and Sunagawa et al. processes involve solid state reactions and potentially offer higher throughput and lower manufacturing costs than processes based on coprecipitation. However, when we attempted to replicate some of the Paulsen et al. and Sunagawa et al. compounds using the described processes we obtained multiple phase compounds rather than the desired single-phase structure. Also, when we attempted to prepare the above-mentioned compounds of formulas I through III (which fall outside formulas IV and V) using a solid state reaction, we obtained multiple phase compounds rather than the desired single-phase structure. By using about 15 wt. % excess lithium, we were able to make compounds in the solid solution between $LiCoO_2$ and $Li_2MnO_3$ by solid state reaction. The excess lithium aided formation of a single-phase material, but the resulting product had poor electrochemical performance.

We have now found that single-phase lithium-transition metal oxide compounds containing cobalt, manganese and nickel can be prepared by:

a) wet milling cobalt-, manganese-, nickel- and lithium-containing oxides or oxide precursors to form a finely-divided slurry containing well-distributed cobalt, manganese, nickel and lithium, and b) heating the slurry to provide a lithium-transition metal oxide compound containing cobalt, manganese and nickel and having a substantially single-phase O3 crystal structure.

Wet milling provides significantly shorter milling times than dry milling and appears to promote formation of single-phase lithium-transition metal oxide compounds. The time savings in the wet milling step more than offsets the time that may be required to dry the slurry during the heating step.

The invention provides, in another aspect, a process for making a lithium-ion battery cathode comprising the further step of mixing particles of the above-described lithium-transition metal oxide compound with conductive carbon and a binder and coating the resulting mixture onto a supporting substrate.

The invention provides, in yet another aspect, a process for making a lithium-ion battery comprising placing the above-described cathode, an electrically compatible anode, a separator and an electrolyte into a container.

The invention provides, in yet another aspect, lithium-transition metal oxide compounds (and a lithium ion battery comprising at least one compound) having the formula:

$$Li_aCo_bMn_cNi_{1-b-c}O_2 \quad (VI).$$

where $0 \leq a \leq 1.2$, $0.52 < b \leq 0.98$, $0.01 \leq c \leq 0.47$ and $0.53 < b+c \leq 0.99$ The invention provides, in yet another aspect, a lithium-transition metal oxide composition (and a lithium ion battery comprising at least one composition) consisting essentially of a compound selected from the group consisting of the single-phase compounds:

$$LiNi_{0.1}Mn_{0.1}Co_{0.8}O_2 \quad (I)$$

$$Li(Co_{(1/3)}Mn_{(1/3)}Ni_{(1/3)})O_2 \quad (II) \text{ and}$$

$$Li(Li_{0.08}Co_{0.15}Mn_{0.375}Ni_{0.375})O_2 \quad (III)$$

These and other aspects of the invention will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWING

Like reference symbols in the various drawings indicate like elements. The elements in the drawing are not to scale.

DETAILED DESCRIPTION

Figure 1:
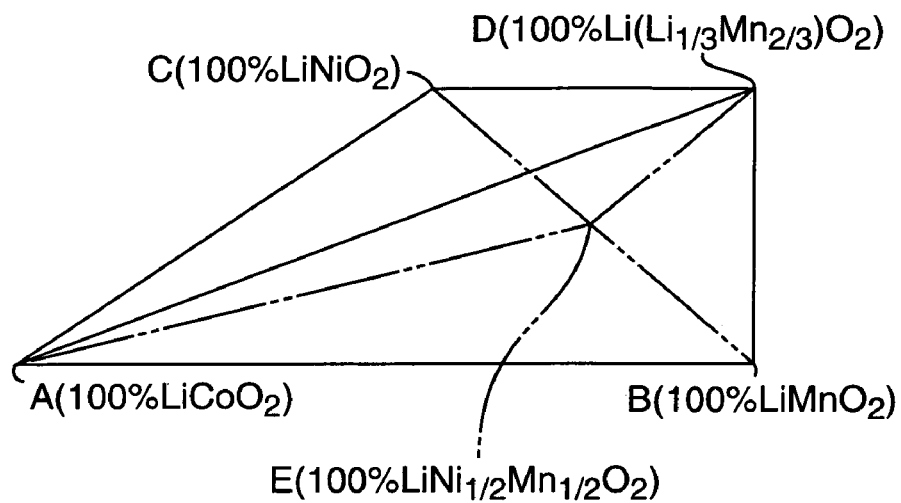
FIG. 1 is a triangular pyramidal plot showing a variety of lithium-transition metal oxide compositions.

The disclosed lithium-transition metal oxide compounds have particular utility for making lithium-ion battery cathodes. The compounds are formed by wet milling together cobalt-, manganese-, nickel- and lithium-containing oxides or oxide precursors while imparting sufficient energy to the milled ingredients to form them into a finely-divided slurry containing well-distributed cobalt, manganese, nickel and lithium. The oxides or oxide precursors do not need to be mixed together all at once. We have found that by first milling together the lower surface area or larger particle diameter materials to increase their surface area or reduce their particle size to match the surface area or particle size of the later-added components, a more homogeneous and finely-divided final mixture can be produced using a shorter milling time. Very high surface area components (such as hydroxides) that may tend to agglomerate in a milling vessel can be more homogeneously blended with other components that have already been milled to a similar high surface area. A homogeneous and finely-divided final milled mixture can help promote formation of a single-phase fired product. For example, in a milling scheme that could be referred to as "manganese and nickel first, lithium last", manganese- and nickel-containing oxides or oxide precursors can be wet milled together and formed into a finely divided first slurry containing well-distributed manganese and nickel; followed by addition of a cobalt-containing oxide or oxide precursor to form a finely divided second slurry containing well-distributed cobalt, manganese and nickel, followed by addition of a lithium-containing oxide or oxide precursor to form a finely divided third slurry containing well-distributed cobalt, manganese, nickel and lithium. A milling scheme that could be described as "cobalt, manganese and nickel first, lithium last" can be used to promote formation of a slurry containing well-distributed cobalt, manganese and nickel prior to addition of lithium. Milling schemes such as "manganese and nickel first, cobalt and lithium last", "manganese and nickel first, cobalt last" (with lithium being added after the manganese and nickel and before the cobalt), "nickel and cobalt first, manganese and lithium last", "lithium and cobalt first, manganese and nickel last" and other permutations that will be apparent to those skilled in the art may also be employed.

Suitable cobalt-, manganese- and nickel-containing oxides or oxide precursors include cobalt hydroxide (Co(OH)$_2$), cobalt oxides (e.g., Co$_3$O$_4$ and CoO), manganese carbonate (Mn$_2$CO$_3$), manganese oxide (MnO), manganese tetroxide (Mn$_3$O$_4$), manganese hydroxide (Mn(OH)$_2$), basic manganese carbonate (Mn$_2$CO$_3$*–Mn(OH)$_2$), nickel carbonate (Ni$_2$CO$_3$), nickel hydroxide (Ni(OH)$_2$), and basic nickel carbonate (Ni$_2$CO$_3$*–Ni(OH)$_2$), Preferably at least one of the manganese or nickel precursors is a carbonate.

Suitable lithium-containing oxides and oxide precursors include lithium carbonate (Li$_2$CO$_3$) and lithium hydroxide (LiOH). If desired, hydrates of the precursors can be employed.

Figure 2:
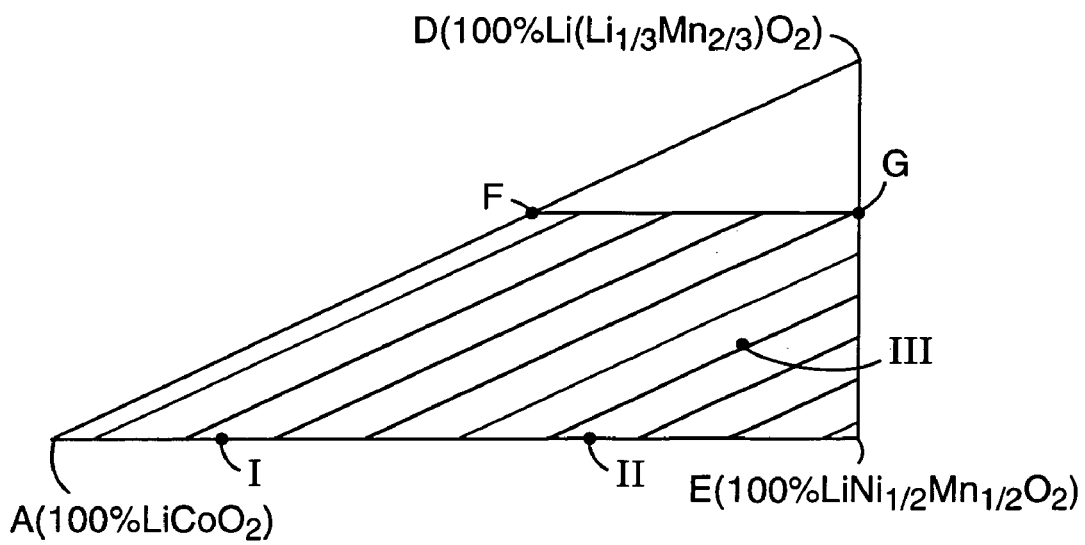
FIG. 2 is a triangular plot showing a certain lithium-transition metal oxide compositions from FIG. 1.

The amounts of each oxide or oxide precursor typically are selected based on the composition of a targeted final compound. A wide variety of targeted final compounds can be prepared. The plots shown in FIG. 1 and FIG. 2 can assist in selecting a target. FIG. 1 is a triangular pyramidal plot whose vertices A, B, C and D respectively represent the compositions LiCoO$_2$, LiMnO$_2$, LiNiO$_2$ and Li(Li$_{1/3}$Mn$_{2/3}$)O$_2$. Vertices A, B and C thus respectively represent maximum cobalt, manganese and nickel contents for binary lithium-transition metal oxide compounds containing these transition metals in the indicated stoichiometry. Point E located midway along edge BC represents the composition LiMn$_{1/2}$Ni$_{1/2}$O$_2$. Points within the plot located above base ABC represent lithium intercalation compounds. FIG. 2 is a triangular plot representing the plane defined by points A, D and E. The trapezoidal region AEFG in FIG. 2 (but excluding points nearest, e.g., within about 0.01 transition metal mole units, to the vertices A and D) illustrates an especially preferred set of compositions containing equimolar amounts of manganese and nickel. This preferred set of compositions can be represented by the formula Li$_a$[Co$_x$(Ni$_{1/2}$Mn$_{1/2}$)1–x]O$_2$, where $0 \leq a \leq 1.2$ and $0.1 \leq x \leq 0.98$. The compounds of Formulas I, II and III are shown as points within region AEFG.

A variety of wet milling techniques may be employed including media milling (e.g., ball milling, attritor milling, horizontal milling or vertical milling), medialess milling (e.g., hammer milling, jet milling or high pressure dispersion milling) and other techniques that will adequately pulverize and mix together the cobalt-, manganese- and nickel-containing oxides or oxide precursors. When media milling is employed, suitable media include ceramic media (e.g., ceramic rods or balls). Water is a preferred wet milling liquid but other substances such as low boiling point alcohols, toluene and acetone can be employed if desired. Ball milling should be carried out for a sufficient time and with sufficient vigor so that the final slurry contains well-distributed cobalt, manganese, nickel and lithium. Preferably the slurry is milled until it contains relatively small particles, e.g., with an average particle diameter less than about 0.3 μm, preferably less than about 0.1 μm as measured using scanning electron microscope (SEM) imaging. Perfectly even distribution of the metals throughout the slurry and minimum average particle diameters are not required. However, particles of a given single metal component larger than 0.5 μm preferably are avoided. The extent to which milling is carried out will merely need to be sufficient to provide the desired single-phase lithium-transition metal oxide compound at the end of the heating step. Appropriate mixing times (and when used, media) typically will depend in part on factors such as the starting materials and mixing equipment employed. Often some measure of experimentation will help in a given production setting for determining the appropriate milling times or media so that the desired single-phase lithium-transition metal oxide compound can be obtained.

If desired, other transition metal oxides or oxide precursors can be included in the lithium-transition metal oxide compositions before they are fired to provide the final lithium-transition metal oxide compounds. Representative examples include iron, vanadium, aluminum, copper, zinc, zirconium, molybdenum, niobium, and combinations thereof. These other transition metal oxides or oxide precursors can be added together with the other ingredients used to form the slurry or after the slurry has been formed.

The slurry is converted to a lithium-transition metal oxide compound by separating the slurry and media (if used) and by firing, baking, sintering or otherwise heating the slurry for a sufficient time and at sufficient temperatures to form the desired single-phase compound. The heating cycle preferably employs a rapid heating rate, e.g., 10 or more ° C. per hour. A preferred heating cycle is at least 10° C./min to a temperature of at least 900° C. Air is a preferred heating atmosphere but other gases such as oxygen or mixtures of carbon dioxide, carbon monoxide, and hydrogen can be employed if desired. If temperatures above about 1050° C. are employed then a ceramic furnace and longer cooling times may be required. Such higher temperatures can help in obtaining a single-phase lithium-transition metal oxide compound but may also increase capital costs and diminish throughput. If temperatures as high as 1100° C. are employed, then lithium ion batteries made using the lithium-transition metal oxide compound may exhibit a slight increase in irreversible first cycle capacity loss. Preferably the maximum heating temperature is less than 1050° C., more preferably less than 1000° C., and most preferably not more than 900° C.

The resulting lithium-transition metal oxide compound preferably is formed as or converted to finely-divided particles having the desired average particle diameter. For example, the lithium-transition metal oxide compound can be prepared using a feed back mechanism in which the oxide is fired using a rotary calciner or other suitable firing device and sorted by size so that particles larger than desired are wet-milled further (or if desired, dry-milled) and particles that are smaller than desired are fired further in the calciner. In this fashion a suitable particle size distribution can be obtained.

The lithium-transition metal oxide compound may be used alone in the cathode or as a cathodic additive in combination with other cathode materials such as lithium oxides, sulfides, halides, and the like. For example, the lithium-transition metal oxide compound may be combined with conventional cathode materials such as lithium cobalt dioxide or with compounds such as $LiMn_2O_4$ spinel and $LiFePO_4$. The amount of other cathode material to be added is selected such that the number of moles of lithium available from the other cathode material matches the number of moles of lithium irreversibly consumed by the anode. The number of moles of lithium irreversibly consumed, in turn, is a function of the properties of the individual anode.

The cathode can be combined with an anode and an electrolyte to form a lithium-ion battery. Examples of suitable anodes include lithium metal, graphite, hard-carbon, and lithium alloy compositions, e.g., of the type described in U.S. Pat. No. 6,203,944 (Turner '944) entitled "ELECTRODE FOR A LITHIUM BATTERY" and PCT Published patent application Ser. No. WO 00103444 (Turner PCT) entitled "ELECTRODE MATERIAL AND COMPOSITIONS". The electrolyte may be liquid, solid, or a gel. Examples of solid electrolytes include polymeric electrolytes such as polyethylene oxide, polytetrafluoroethylene, fluorine-containing copolymers, and combinations thereof. Examples of liquid electrolytes include ethylene carbonate, diethyl carbonate, propylene carbonate, and combinations thereof. The electrolyte is typically provided with a lithium electrolyte salt. Examples of suitable salts include $LiPF_6$, $LiBF_4$, and $LiClO_4$. Preferably the battery capacity does not substantially decrease after the battery is charged and discharged between 4.4 and 2.5 volts for at least 100 cycles at a 75 mA/g discharge rate.

The invention is further illustrated in the following illustrative examples, in which all parts and percentages are by weight unless otherwise indicated.

EXAMPLES

X-Ray Diffraction

A powder x-ray diffraction (XRD) pattern for each sample was collected using a Siemens D500 diffractometer equipped with a copper target X-ray tube and a diffracted beam monochromator. Samples were prepared as flat rectangular powder-beds sufficiently thick and wide that the volume of powder illuminated by the x-ray beam was constant. The data were analyzed using the GSAS version of the Rietveld refinement program as described in A. C. Larson and R. B. Von Dreele, "General Structure Analysis System (GSAS)", Los Alamos National Laboratory Report LAUR 86–748 (2000). Two statistics Rp, and $Chi^2$ calculated by the GSAS program were used to determine the quality of fit (expressed as the residual error on fitting for the case of Rp and as the goodness-of-fit for the case of $Chi^2$) for a model of the intended single-phase crystal-structure to the data. The lower the value for Rp, the better the fit of the model to the data. The closer $Chi^2$ is to unity (1.000), the better the fit of the model to the data. Rp and $Chi^2$ are generally higher when an unaccounted-for phase or phases are present. The lattice constants or dimensions of the unit cell were also calculated using the GSAS program.

Electrochemical Cell Preparation

The powders were formulated by blending together 2.0 parts of the oxide power, 2.3 parts of N-methyl pyrrolidinone, 1.1 parts of a solution of 10 wt % KYNAR™ 461 polyvinylidene fluoride (available from Elf Atochem) in N-methyl pyrrolidinone, and 0.11 parts SUPER-P™ conductive carbon (available from MMM Carbon, Belgium). The suspension was stirred at high shear for greater than 1 hour, then coated on aluminum foil with a notch bar to provide a 90% active, 5% polyvinylidene fluoride, 5% conductive carbon coating. The coating was dried under vacuum at 150° C. for 4 hrs, then converted into 2325 coin cells (half cells) using a metallic 380 micrometer thick, 17 mm diameter Li foil anode, 2 layers of 50 micrometer thick CELLGARD™ 2400 separator (commercially available from Hoechst-Celanese), and 1 molal $LiPF_6$ in a 1:2 by volume mixture of ethylene carbonate and diethyl carbonate as the electrolyte.

Figure 3:
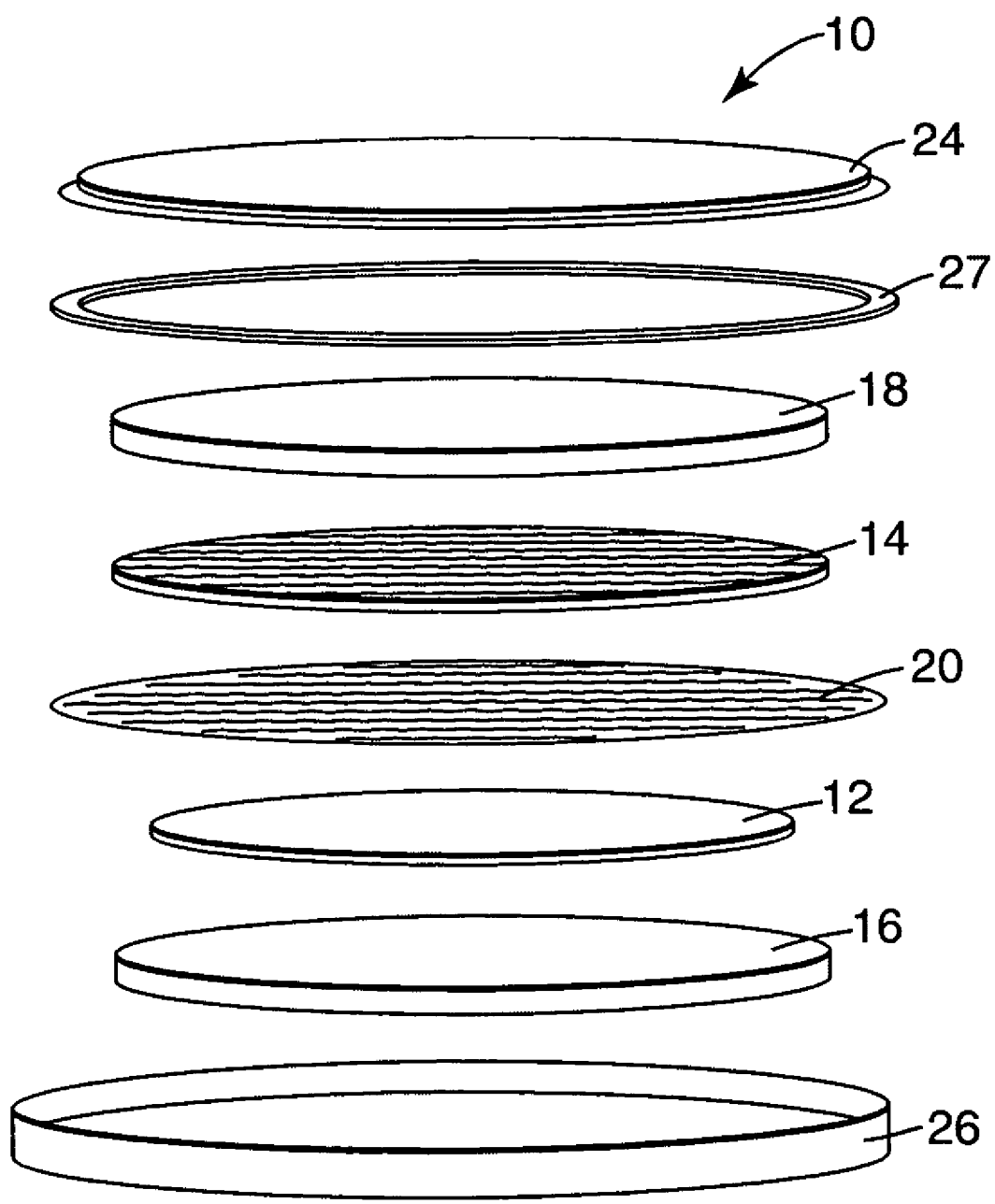
FIG. 3 is an exploded perspective view of an electrochemical cell.

An exploded perspective view of the electrochemical cell 10 used to evaluate the cathodes is shown in FIG. 3. A stainless steel cap 24 and special oxidation resistant case 26 contain the cell and serve as the negative and positive terminals respectively. The cathode 12 was prepared as described above. The lithium foil anode 14 also functioned as a reference electrode. The cell featured 2325 coin-cell hardware equipped with an aluminum spacer plate 16 behind the cathode and a copper spacer plate 18 behind the anode. The spacers 16 and 18 were selected so that a tightly squeezed stack would be formed when the cell was crimped closed. The separator 20 was wetted with a 1M solution of LiPF dissolved in a 1:2 by volume mixture of ethylene carbonate and diethyl carbonate. A gasket 27 was used as a seal and to separate the two terminals. The cells were cycled at room temperature and a "C/5" (five hour charge and five hour discharge) rate using a constant current cycler.

Example 1

Metal containing precursors were combined in proportions to yield the final oxide composition $LiNi_{0.1}Mn_{0.1}Co_{0.8}O_2$. Accurate batching was achieved by assaying the precursors. The assays were performed by baking aliquots of the precursors at 600° C. overnight to yield completely water free single phase oxides. Measurements of the weights before and after heating combined with the knowledge of the final phase composition were used to calculate the mass per mole of metal in each precursor. This method allowed batching with at least a +/−0.1 weight percent precision. The precursors $NiCO_3$ (22.44 parts, available from Spectrum Chemical) and $MnCO_3$ (21.48 parts, Spectrum Chemical) were placed in a 1 liter high-density polyethylene SWECO™ mill jar (available from Sweco) along with 333 parts ZIRCOA™ 12.7 mm radius end cylinder zirconium oxide media (available from Zircoa, Inc.) and 1000 parts of similar 6.35 mm ZIRCOA zirconium oxide media. 200 parts deionized (DI) water were added to the mill jar and the nickel and manganese carbonates were wet-milled in a SWECO M18-5 mill (available from Sweco) for 24 hours. $Li_2CO_3$ (68.12 parts, available from FMC, Philadelphia, Pa.), $Co(OH)_2$ (137.97 parts, available from Alfa Aesar) and an additional 100 parts DI water were added to the mill jar, then milled for an additional 4 hours. The resulting wet-milled slurry was poured into a PYREX™ cake pan (available from Corning, Inc.) and air-dried overnight at 70° C. The dried cake was scraped from the pan, separated from the media and granulated through a 25 mesh (707 μm) screen. The resulting screened powder was placed in a clean polyethylene bottle and the lid sealed with tape.

15 Parts of the screened powder were placed in an alumina crucible and heated from room temperature to 900° C. in oxygen over a one hour period, held at 900° C. for 3 hours, and cooled. The resulting fired powder was submitted for XRD analysis using the Rietveld refinement. The observed XRD pattern indicated that the fired powder had a single phase.

The fired powder was used to form a cathode in an electrochemical cell as described above. The electrochemical cell had a capacity of 146 mAh/g. The irreversible first cycle capacity loss was 5% after charging and discharging the cell to 4.3 volts.

Example 2

15 Parts of the wet-milled slurry from Example 1 were heated in oxygen using a "ramp-soak" cycle as follows. The slurry was placed in an alumina crucible and heated in an oven whose temperature was increased from room temperature to 250° C. over 20 minutes, held at 250° C. for one hour, increased to 750° C. over 20 minutes, held at 750° C. for another hour, increased to 900° C. over 20 minutes and then held at 900° C. for three hours. The fired sample was cooled in the furnace overnight, then submitted for XRD analysis using the Rietveld refinement. The observed XRD pattern of the $LiNi_{0.1}Mn_{0.1}Co_{0.8}O_2$ indicated that the sample had a single phase.

Comparison Example 1

Powders of $Co(OH)_2$ (7.63 parts, available from Alfa Aesar), $NiCO_3$ (1.27 parts, available from Spectrum Chemical) and $MnCO_3$ (1.17 parts, available from Spectrum Chemical) were combined in a tungsten carbide milling jar having approximately a 100 ml volume and containing one 15 mm ball and seven 6 mm balls of Zircon milling media like that used in Example 1. The components were dry-milled for 30 minutes on a SPEX Model 8000-D Dual Shaker Mixer (available from SPEX CertiPrep Inc.). Lithium was added to the transitional metal mixture in the form of $Li_2CO_3$ (3.79 parts, available from FMC). After the lithium addition, further dry-milling was carried out for 15 minutes.

After milling, the mixture was transferred to alumina crucibles and fired to a temperature of 900° C. and held at that temperature for one hour. This yielded a compound of the formula $LiNi_{0.1}Mn_{0.1}Co_{0.8}O_2$ which was found to have at least two phases by XRD analysis.

Comparison Example 2

Aqueous solutions of nickel, manganese, and cobalt nitrate were combined in a 1:8:1 Ni:Co:Mn molar ratio. The mixture was dripped into a turbulently stirred aqueous solution of 1.6 M LiOH, which was present in 20% excess for the production of $Ni_{0.1}Mn_{0.1}Co_{0.8}(OH)_2$. The resulting slurry was filtered and washed continuously in a basket centrifuge until the residual Li in the wet cake was less than 0.2 atomic percent of the metals present. Next the cake of washed hydroxide material was dried at less than 120° C. until brittle and subsequently pulverized to pass a 500 micron sieve. This powder was assayed for metals content. The powder plus $Li_2CO_3$ were combined in a 100 ml tungsten carbide mill (available from Fritsch GmbH) in a 10:1:8:1 Li:Ni:Co:Mn molar ratio. Ten small 5 mm balls of Zircon milling media like those used in Example 2 were added to the vessel. The vessel was shaken for 10 minutes in a SPEX™ CertiPrep™ mixer/mill (available from SPEX CertiPrep Inc.). The resulting mixture was transferred to an alumina crucible and heat treated for 1 hour at 480° C., 1 hour at 750° C., and finally 1 hour at 900° C. The resulting powder was ground in a mortar and pestle and examined by XRD using Rietveld refinement. The observed XRD pattern indicated that the single-phase compound $LiNi_{0.1}Mn_{0.1}Co_{0.8}O_2$ of Formula I had been obtained. This was the same product as obtained in Example 1 and Example 2, but required lengthy washing and drying steps that were not needed in Example 1 and Example 2.

A number of embodiments of the invention have been described. Nevertheless, it will be understood that various modifications may be made without departing from the spirit and scope of the invention. Accordingly, other embodiments are within the scope of the following claims.

We claim:

1. A process for making single-phase lithium-transition metal oxide compounds containing cobalt, manganese and nickel comprising:
   a) wet milling cobalt-, manganese-, nickel- and lithium-containing oxides or oxide precursors to form a finely-divided slurry containing well-distributed cobalt, manganese, nickel and lithium, and
   b) heating the slurry to provide a lithium-transition metal oxide compound containing cobalt, manganese and nickel and having a substantially single-phase O3 crystal structure.

2. A process according to claim 1 wherein water is used for wet milling.

3. A process according to claim 1 comprising milling the slurry until it contains particles having an average particle diameter less than about 0.3 µm.

4. A process according to claim 1 comprising milling the slurry until it contains particles having an average particle diameter less than about 0.1 µm.

5. A process according to claim 1 comprising milling the powders using ceramic media.

6. A process according to claim 1 wherein the precursors comprise one or more carbonates.

7. A process according to claim 6 wherein at least one of the precursors comprises manganese or nickel carbonate.

8. A process according to claim 1 comprising milling together equimolar amounts of manganese- and nickel-containing oxides or oxide precursors.

9. A process according to claim 1 comprising heating the slurry at a rate of at least 10° C./min to a temperature of at least 800° C.

10. A process according to claim 1 comprising heating the slurry to a temperature at or below 1050° C.

11. A process according to claim 1 wherein the lithium-transition metal oxide compound is selected from those represented by the formula $Li_a[Co_x(Ni_{1/2}Mn_{1/2})1-x]O_2$, where $0 \leq a \leq 1.2$ and $0.1 \leq x \leq 0.98$.

12. A process according to claim 1 wherein the lithium-transition metal oxide compound has the approximate formula $Li(Co_{(0.8)}Mn_{0.1}Ni_{0.1})O_2$.

13. A process according to claim 1 wherein the lithium-transition metal oxide compound has the approximate formula $Li(Co_{(1/3)}Mn_{(1/3)}Ni_{(1/3)})O_2$.

14. A process according to claim 1 wherein the lithium-transition metal oxide compound has the approximate formula $Li(Li_{0.08}Co_{0.15}Mn_{0.375}Ni_{0.375})O_2$.

15. A process according to claim 1 further comprising mixing particles of the lithium-transition metal oxide compound with conductive carbon and a binder and coating the resulting mixture onto a supporting substrate to form a lithium-transition metal oxide cathode.

16. A process according to claim 15 further comprising placing the cathode, an electrically compatible anode, a separator and an electrolyte into a container to form a lithium ion battery.

17. A process according to claim 16 wherein the battery capacity does not substantially decrease after the battery is charged and discharged between 4.4 and 2.5 volts for at least 100 cycles at a 75 mA/g discharge rate.

18. A process according to claim 1 comprising wet milling cobalt-, manganese-, nickel- and lithium-containing oxide precursors.

* * * * *

UNITED STATES PATENT AND TRADEMARK OFFICE
CERTIFICATE OF CORRECTION

PATENT NO. : 7,211,237 B2  Page 1 of 1
APPLICATION NO. : 10/723511
DATED : May 1, 2007
INVENTOR(S) : Kevin W. Eberman It is certified that error appears in the above-identified patent and that said Letters Patent is hereby corrected as shown below:

Column 4
Line 1, delete "$(Mn_2CO_3*\text{---}Mn(OH)_2)$" and insert --$(Mn_2CO_3*xMn(OH)_2)$--

Line 3, delete "$(Ni_2CO_3*\text{---}Ni(OH)_2)$" and insert --$(Ni_2CO_3*xNi(OH)_2)$--

Signed and Sealed this

Twenty-fifth Day of December, 2007

JON W. DUDAS
*Director of the United States Patent and Trademark Office*